H. E. COFFIN.
CLUTCH AND BRAKE CONTROL FOR MOTOR VEHICLES.
APPLICATION FILED NOV. 9, 1908.

Witnesses

Inventor
Howard E. Coffin.
By Whittemore, Hulbert & Whittemore
Attys

H. E. COFFIN.
CLUTCH AND BRAKE CONTROL FOR MOTOR VEHICLES.
APPLICATION FILED NOV. 9, 1908.

1,105,548.

Patented July 28, 1914.
2 SHEETS—SHEET 2.

UNITED STATES PATENT OFFICE.

HOWARD E. COFFIN, OF DETROIT, MICHIGAN, ASSIGNOR TO CHALMERS-DETROIT MOTOR COMPANY, OF DETROIT, MICHIGAN, A CORPORATION OF MICHIGAN.

CLUTCH AND BRAKE CONTROL FOR MOTOR-VEHICLES.

1,105,548.  Specification of Letters Patent.  Patented July 28, 1914.

Application filed November 9, 1908. Serial No. 461,776.

*To all whom it may concern:*

Be it known that I, HOWARD E. COFFIN, a citizen of the United States of America, residing at Detroit, in the county of Wayne and State of Michigan, have invented certain new and useful Improvements in Clutch and Brake Control for Motor-Vehicles, of which the following is a specification, reference being had therein to the accompanying drawings.

The invention relates to control mechanism for motor vehicles and consists in the peculiar construction whereby a single pedal is employed for controlling both the main clutch and the brake.

Figure 1:
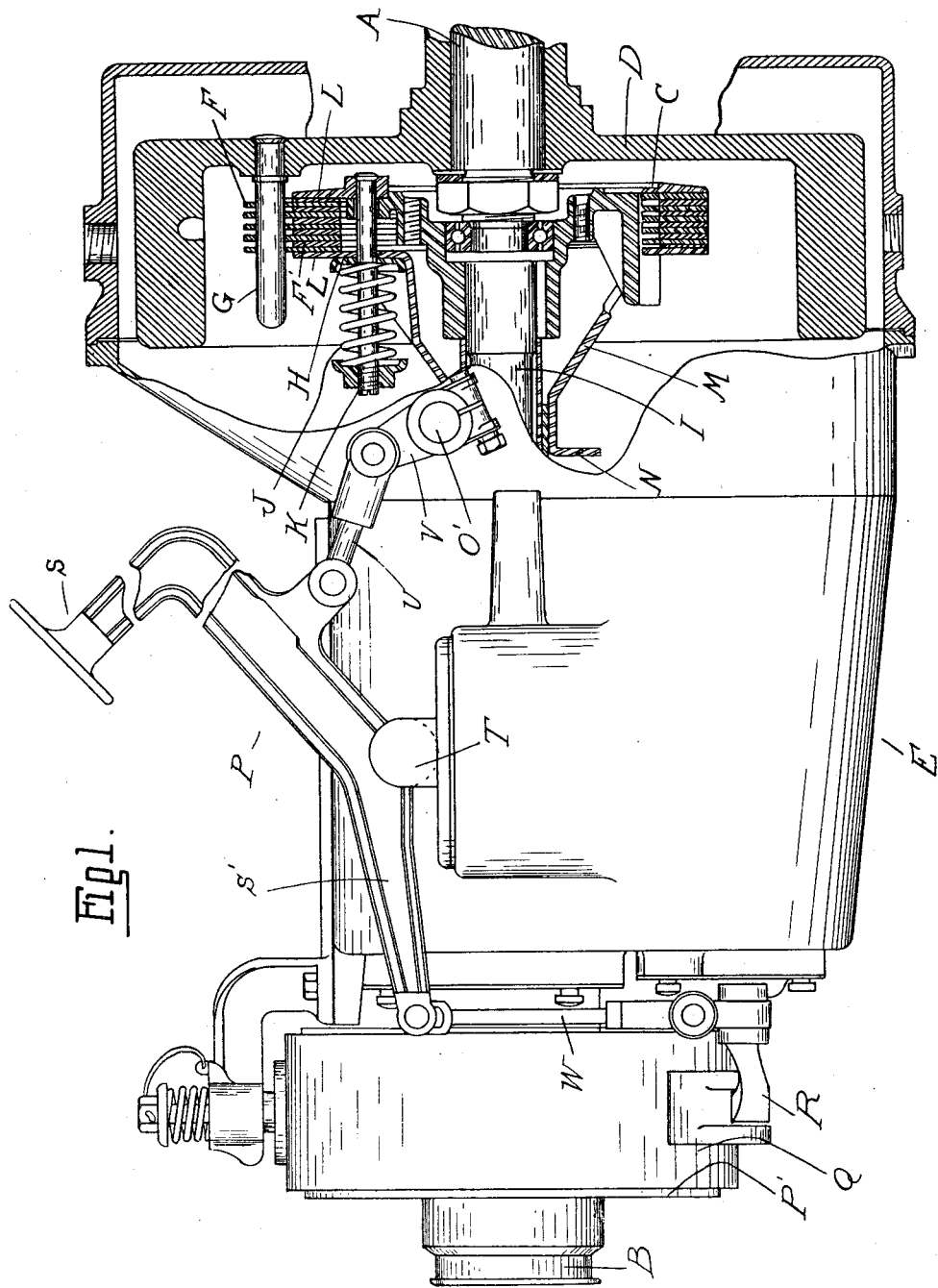
Figure 2:
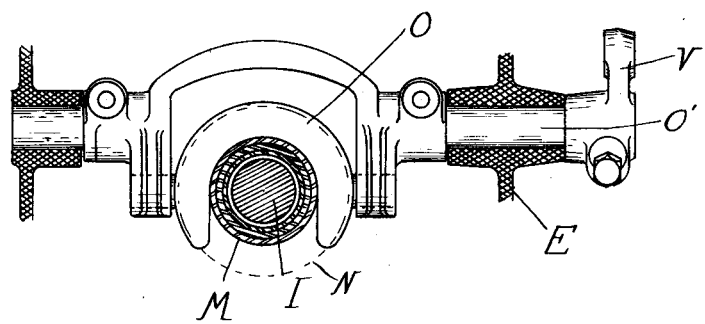

In the drawings: Figure 1 is a sectional elevation of a portion of the transmission mechanism of a motor vehicle to which my improvements are applied; Fig. 2 is a cross section thereof.

A is the motor shaft, B the transmission shaft, and C the main clutch for coupling the motor to the transmission. This clutch is preferably arranged within the fly wheel D for the motor, and is also preferably associated with a variable speed transmission gearing which is arranged intermediate the motor and the transmission shaft B. The particular construction of this variable speed transmission forms no part of the present invention, and I have therefore illustrated merely the casing E, in which said transmission is located.

The clutch C, as illustrated, is of the multiple disk type comprising the alternately arranged disks F and F'. The disks F are connected by pins G engaging the peripheral portion thereof to the fly wheel D, while the disks F' engage the head H upon the shaft I in alinement with the motor shaft A. The clutch is automatically engaged by springs J which in coöperation with pins K operate clamping plates L at opposite ends of the series of disks. For releasing the clutch a member M is connected to one of the clamping plates and sleeved upon the shaft I, and provided at its outer end with a flange N, which is engaged by a bearing O on a rocker O' so as to be drawn outward against the tension of the springs J when the clutch is released. The brake P is preferably arranged at the outer end of the transmission gearing and comprises a brake head P' and a surrounding brake strap Q which is applied by a movement of the lever R.

For controlling the clutch, and also for applying the brake, I employ a single actuating member, and preferably a pedal lever S. This, as shown, is fulcrumed at T upon the housing E for the transmission gearing and is coupled to the rocker O' through the medium of a link U and rock arm V. The connection to the brake is formed by an extension S' of the lever beyond the fulcrum, which is coupled to a vertical connecting rod W attached to the lever R.

With the construction as described, in operation the pedal S is held in its normal position by the tension of the springs J, and in a position where the clutch is in engagement. To release the clutch, either wholly or partially, the pedal is operated and through the medium of the link U and rock arm V will actuate the rocker O' so as to draw upon the flange N and moving the clamping plate H against the tension of the spring J. A lost motion connection is provided between the pedal lever and the link W to permit the full release of the clutch before application of the brake strap to the brake head. If, however, the operator desires to apply the brake a further movement of the pedal will produce this result.

What I claim as my invention is:

1. In a motor vehicle, the combination with the motor shaft, the transmission and a casing for the transmission, of a clutch intermediate said motor shaft and transmission, a brake applied to the transmission, a pedal lever fulcrumed on said casing, a rocker for releasing said clutch, a link connecting said rocker with said pedal lever upon one side of the fulcrum of the latter, a lever for actuating said brake, and a link connecting said last-mentioned lever with the pedal lever upon the opposite side of the fulcrum of the pedal lever.

2. In a motor vehicle, the combination with the motor shaft, the transmission and a casing for the transmission, of a clutch intermediate said motor shaft and transmission, a brake applied to the transmission, a pedal lever fulcrumed on said casing, a rocker for releasing said clutch, a link connecting said rocker with said pedal lever upon one side of the fulcrum of the latter, a lever for actuating said brake, a link connecting said last-mentioned lever with the pedal lever upon the opposite side of the fulcrum of the pedal lever, and a lost-motion connection between said pedal lever and said last-mentioned link.

3. In a motor vehicle, the combination with the motor shaft, the transmission and a casing for said transmission, having a projection thereon, of a clutch intermediate said motor shaft and transmission, a brake applied to the transmission, and a single pedal lever fulcrumed on the projection of said casing, connected with said brake and clutch for successively releasing said clutch and applying said brake, the connections between the pedal lever and the brake and clutch being respectively upon opposite sides of and at points spaced from the fulcrum of the latter and independent of said fulcrum.

4. In a motor vehicle, the combination with the motor shaft and transmission, of a clutch intermediate said motor shaft and transmission, a brake applied to the transmission, a pedal lever fulcrumed intermediate its ends, a connection between the clutch and the lever upon one side of and at a distance from the pedal lever fulcrum, and a connection between the brake and said lever upon the opposite side of and at a distance from said fulcrum, said connections being secured to the lever independent of its fulcrum.

5. In a motor vehicle, the combination with the motor shaft, the transmission and transmission casing, of a clutch intermediate the motor shaft and the transmission, a brake applied to the transmission, a pedal lever fulcrumed intermediate its ends upon the casing, a connection between the clutch and the lever upon one side of and at a distance from the fulcrum of the latter, and a connection between the brake and the lever upon the opposite side of and at a distance from said fulcrum, said connections being secured to the lever independent of the fulcrum thereof.

6. In a motor vehicle, the combination with the motor shaft and the transmission, of a clutch intermediate said motor shaft and transmission, a brake applied to the transmission, a pedal lever fulcrumed intermediate its ends, actuating members for the brake and clutch connected to the pedal lever respectively upon opposite sides of and at points spaced from its fulcrum, and independent thereof, the connections between the actuating member and the pedal lever being in substantially the longitudinal plane of said lever.

7. In a motor vehicle, the combination with the motor shaft, the transmission and the transmission casing, of a clutch, intermediate said motor shaft and transmission, a pedal lever fulcrumed intermediate its ends upon said casing, actuating members for the brake and clutch, one of said actuating members being connected to the pedal lever at one end and upon one side of and at a distance from the pedal lever fulcrum, and the other actuating member being connected to the pedal lever intermediate the opposite end of the latter and its fulcrum.

In testimony whereof I affix my signature in presence of two witnesses.

HOWARD E. COFFIN.

Witnesses:
NELLIE KINSELLA,
JAMES P. BARRY.